United States Patent [19]

Kiewit et al.

[11] Patent Number: 4,697,209

[45] Date of Patent: Sep. 29, 1987

[54] METHODS AND APPARATUS FOR AUTOMATICALLY IDENTIFYING PROGRAMS VIEWED OR RECORDED

[75] Inventors: David A. Kiewit, Palm Harbor; Daozheng Lu, Dunedin, both of Fla.

[73] Assignee: A. C. Nielsen Company, Northbrook, Ill.

[21] Appl. No.: 604,367

[22] Filed: Apr. 26, 1984

[51] Int. Cl.[4] ............... H04H 9/00; H04N 17/04; H04N 17/06
[52] U.S. Cl. .................................. 358/84; 455/2
[58] Field of Search .......... 179/2 AS; 358/84, 139, 358/908; 455/2, 67; 379/92

[56] References Cited

U.S. PATENT DOCUMENTS

| | | | |
|---|---|---|---|
| 3,742,463 | 6/1973 | Haselwood et al. | 179/2 AS X |
| 3,919,479 | 11/1975 | Moon et al. | 358/84 X |
| 4,230,990 | 10/1980 | Lert, Jr. et al. | 358/84 X |
| 4,450,531 | 5/1984 | Kenyon et al. | 358/84 X |
| 4,511,917 | 4/1985 | Kohler | 358/84 |
| 4,574,304 | 3/1986 | Watanabe et al. | 358/84 |

*Primary Examiner*—Keith E. George
*Attorney, Agent, or Firm*—Mason, Kolehmainen, Rathburn & Wyss

[57] ABSTRACT

A method and apparatus for identifying programs such as television programs received from various sources detects the occurrence of predetermined events such as scene changes in a video signal and extracts a signature from the video signal. The signatures and the times of occurrence of the signatures are stored and subsequently compared with reference signatures to identify the program. The signatures may be compared in pairs to increase resolution, and the time interval between events or signatures may also be used to identify the program, either by themselves or in conjunction with the signatures.

108 Claims, 7 Drawing Figures

METHODS AND APPARATUS FOR AUTOMATICALLY IDENTIFYING PROGRAMS VIEWED OR RECORDED

BACKGROUND THE INVENTION

1. Field of the Invention

This invention relates generally to methods and apparatus for identifying programs and the viewing habits of the public, and more particularly to a method and apparatus for identifying programs, such as television programs obtained from various sources, including video recorders.

2. Description of the Prior Art

Systems for identifying programs such as television programs that are broadcast or viewed are known. Such systems fall into various categories. These categories include manual systems wherein the viewer keeps a diary indicating all of the programs viewed; mechanical, electromechanical and electronic systems that sense the channel to which a television receiver is tuned; systems that detect identifying signals present in the television broadcast signal; and systems that monitor and analyze the program content of the broadcast signal utilizing image processing and correlation techniques to identify the program.

While all of these systems do provide a way to identify programs and to monitor the viewing habits of the public, the manual methods are slow in acquiring data and are prone to inaccuracies resulting from the entry of erroneous data that may be intentionally or unintentionally entered. Systems that monitor the channel to which a receiver is tuned overcome the drawbacks of the manual systems, but require access to the tuning mechanism of the receiver. Such access is becoming increasingly difficult with the advent of cable and pay television systems that utilize various converters and decoders, many of which are difficult to access. Moreover, such systems cannot identify programs played from a source such as a home video recorder. Systems that detect identification signals encoded on the broadcast signal overcome many of the accuracy and access disadvantages described above, but require the cooperation of the broadcasters who must encode the programs prior to broadcast for such systems to be effective. Consequently, such systems are useable only on a limited number of broadcasts, such as network broadcasts. Systems that monitor and analyze the content of the program itself theoretically eliminate the disadvantages of the other systems, but heretofore the information processing requirements of such systems rendered such systems impractical or uneconomical because of the computing capacity required to analyze the vast quantity of information present in a broadcast signals. Moreover, previous attempts to reduce the quantity of information processed tended to introduce inaccuracies.

An example of a system that utilizes the program content of a broadcast signal to identify the program is described in U.S. Pat. No. 3,919,479 to Moon et al. The Moon et al. system utilizes a non-linear analog transform to produce a low frequency envelope waveform, and the information in the low frequency envelope of a predetermined time interval is digitized to generate a signature. The signatures thus generated are compared with reference signatures to identify the program. However, the Moon et al. system generates the signatures continuously, and consequently, requires a large computer to process the data thus generated.

Another system that monitors the program content of a broadcast signal is disclosed in U.S. Pat. No. 4,230,990 to Lert Jr. et al. The system disclosed in the Lert Jr. et al patent reduces the amount of data that must be processed, as compared to the amount of data processed by the Moon et al. patent, by utilizing cues that are either externally generated or present in the program material to initiate the signature generation and correlation process only after a cue has been detected. However, the system disclosed in the Lert Jr. et al. patent is designed to monitor the programs broadcast by broadcasting stations such as network affiliated stations in order to determine whether they are broadcasting the programs required by the networks to be broadcast, rather than as a system for determining the viewing habits of the public. Thus, many of the problems that occur when the habits of a television viewer are being monitored, such as, for example, frequent channel changing, and the problems that occur in identifying programs that are recorded and subsequently played back by a home video recorder are not addressed.

SUMMARY OF THE INVENTION

It is an object of the present invention to provide a method and apparatus for identifying programs that overcome many of the disadvantages of the prior art systems.

It is another object of the present invention to provide an improved method and apparatus for determining the viewing habits of the public that utilizes the content of the program being viewed.

It is another object of the present invention to provide an improved method and apparatus for monitoring broadcasts and determining whether broadcasting stations are broadcasting the programs and commercial messages that they are required to broadcast.

It is yet another object of the present invention to provide a method and apparatus for identifying previously recorded programs being viewed by a viewer.

It is still another object of the present invention to provide a system that accurately identifies programs with a minimal amount of computation utilizing data reduction and correlation techniques on the program material.

It is yet another object of the present invention to provide a program identification system that extracts program identifying signatures only upon the occurrence of certain predetermined events.

It is another object of the present invention to provide a program identifying system that extracts program identifying signatures from the program material and compares the extracted signatures with reference signatures in pairs to provide more accurate identification.

It is yet another object of the present invention to provide a program identifying system that monitors the program material for the occurrence of predetermined events, and monitors the time interval between such events to identify the program, utilizing the events either by themselves or in conjunction with the extracted signatures.

It is yet another object of the present invention to provide a system that alters the identification criteria depending on whether the program being viewed is a broadcast program or a program previously recorded by the viewer.

Therefore, in accordance with a preferred embodiment of the invention, there is provided a system having a home unit that monitors the viewing conditions in the home, for example, whether the television set is on or off, whether any home video recorder (e.g., a video cassette recorder or VCR) is on or off and the video signal being received. By monitoring the aforementioned signals and functions, the system determines whether no viewing is occurring, whether a television broadcast is being viewed, whether a television broadcast is being recorded, whether viewing and recording is occurring simultaneously, or whether a previously recorded program is being viewed. Once the viewing mode has been established, the program being viewed is identified by extracting a characteristic signature from the video signal and storing it for subsequent comparison with reference signatures stored in a central office.

Once the mode of viewing has been determined, a signature of the program material being viewed or recorded is extracted, provided certain predetermined events occur first. These events shall be referred to as Event 1 and Event 2. Several events can serve as Event 1. These events may be a turn on of the television set, a channel change, a predetermined time interval, for example 5 to 10 minutes, since the occurrence of the previous Event 1, or a sudden change to a black scene. Events that can serve as an Event 2 include a scene change to a scene other than a black scene, a color change, which may be an overall color change or a color change of a predetermined line, a still picture as evidenced by several consecutive substantially identical frames, an audio level change, and others.

Upon the occurrence of an Event 1, the home unit monitors the broadcast for the occurrence of an Event 2, and extracts a pair of signatures from the video signal immediately following the next two Event 2s following an Event 1. Or, if a previously recorded program is being viewed, the system extracts three or more signatures from the video signal immediately following the next three or more Event 2s following an Event 1. The signatures are extracted by detecting and digitizing the envelope of the video signal immediately following the Event 2s. The digitized signatures, as well as the times that the signatures were extracted, are stored for future comparison with reference signals stored in a central location. The time intervals between Event 2s are also stored and used to identify the program either by themselves or in conjunction with extracted signatures. The time intervals between Event 2s are particularly useful for identifying the playback of previously recorded video tapes for reasons that will be discussed in a subsequent portion of the specification.

The unit used to acquire the reference signatures that are compared with the signatures received from the home units is similar to the home unit except that the reference signature acquisition unit monitors each broadcast continuously, and does not require an Event 1 to initiate a signature extraction. Therefore, each broadcast is continuously monitored and a signature is extracted each time an Event 2 is detected. The signatures, as well as the times of occurrence of the signatures are stored to form a library of reference signatures. The stored signatures are compared with signatures obtained from the home unit that occurred at approximately the same time. The time intervals between Event 2s are also stored for comparison with corresponding time intervals received from the home units.

DESCRIPTION OF THE DRAWINGS

These and other objects and advantages of the present invention will become readily apparent upon consideration of the following detailed description and attached, drawing wherein.

DETAILED DESCRIPTION OF THE PREFERRED EMBODIMENT

Figure 1:
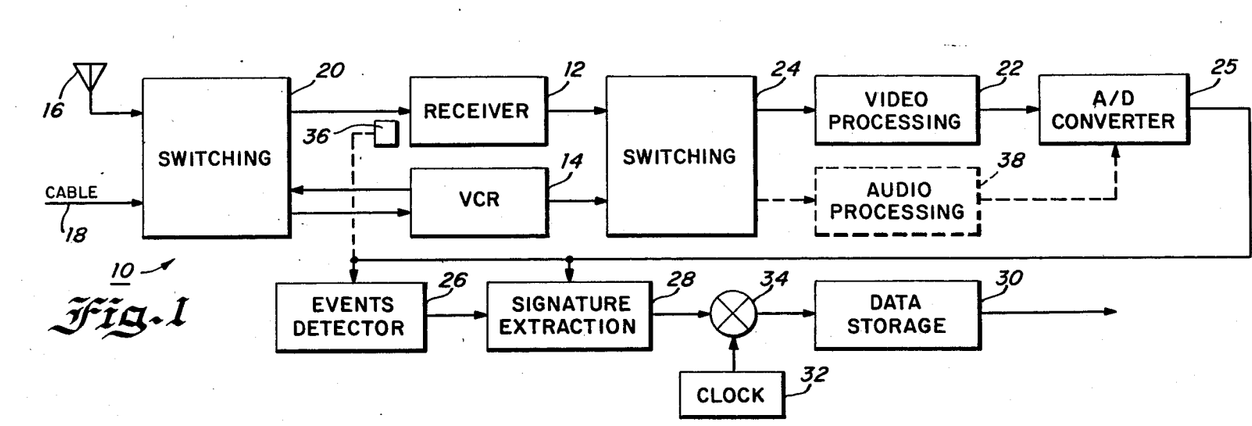
FIG. 1, is a block diagram of the home unit of the program identification system according to the present invention.

Referring now to the drawing, with particular attention to FIG. 1, there is illustrated a block diagram of the home unit of the system according to the invention generally designated by the reference numeral 10. The system 10 receives signals to be identified from a television receiver 12, and in many instances from a home video recorder, such as a video cassette recorder or a VCR 14. In a typical home installation, the receiver 12 and the VCR 14 receive signal from a receiving antenna 16, and in many instances from a cable television system 18. These signals may be applied directly to the receiver 12 and to the VCR 14, but it is convenient to employ a switching network 20 that selectively switches the receiver 12 and VCR 14 to the antenna 16 and to the cable 18 in order to permit the viewing and recording of broadcasts received from the antenna 16 or from the cable 18. In addition, the switching network 20 may connect the VCR 14 to the receiver 12 to permit prerecorded or previously recorded tapes to be played back by the VCR and viewed by the receiver 12.

Video signals representative of the program applied to the receiver 12, as well as video signals representative of the signals being recorded by the VCR 14, are applied to a video processing circuit 22, for example, by a video switching circuit 24 which permits either the receiver 12 or the VCR 14, or both, to be monitored. The video processing circuit 22 includes a detector and a low pass filter (discussed subsequently in greater detail), and provides a signal representative of the envelope of the video signal to an analog-to-digital converter 25 which generates a digital representation of the video envelope. The digitized video envelope signal is applied to an events detector 26 which detects predetermined events that occur in the digitized video signal, and causes the signature of the digitized video signal to be extracted by signature extraction circuitry 28 upon the occurrence of a predetermined sequence of events. The signature thus generated is stored in a data storage system 30 along with the time that the signature was extracted. The extraction times are provided by a clock 32 which provides a digital representation of time to the data storage system 30 via, for example, a combining circuit 34. The clock 32 may be a real time clock or a relative time clock that is periodically reset from a central location. The function of the events detector 26, the signature extractor circuitry 28, the data storage 30 and the clock 32 can be performed by individual circuits as shown or by a microprocessor based system.

Figure 2:
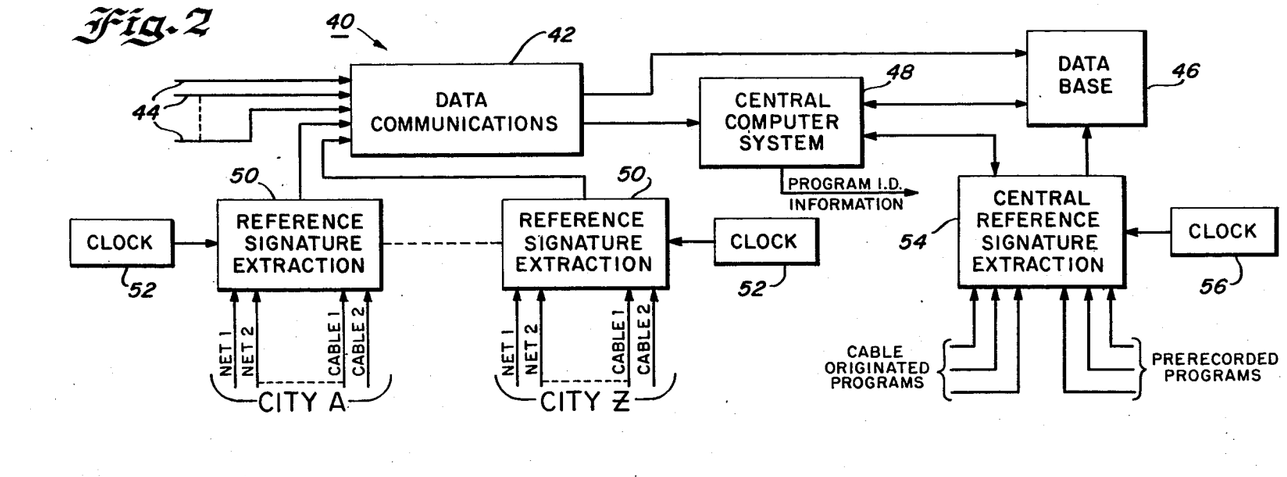
FIG. 2 is a block diagram of the central office and reference signature extraction portions of the system according to the invention.

The home unit 10 is interrogated at periodic intervals, for example, once a day, by a central office unit, generally designated by the reference numeral 40 (FIG. 2), which compares the signatures from the various home units with reference signatures in order to identify the signatures from the home unit. The home units may be periodically interrogated by a data communications circuit 42 that accesses the various home units via a suitable communications system, for example, a plurality of telephone lines 44. The signatures thus collected are compared by a central computer system 48 with signatures stored in a data base 46. Central computer system 48 controls the collection and classification of the signatures received from the home unit as well as the generation of reference signatures to be stored in the data base 46. The latter function is performed in conjunction with a plurality of reference signal extraction circuits 50 that are located in the cities being monitored. The reference signature extraction circuits monitor the various networks, cables and other signal sources in those cities, and extract reference signals, for example, whenever an Event 2 occurs in any of the signals being monitored. The reference signals thus extracted are transmitted to the central office unit 40 and stored in the data base 46 along with the times that such signatures are extracted, as provided by a clock 52. The clock 52 of FIG. 2 is similar to the clock 32 of the home unit and serves to indicate the time of occurrence of the reference signatures. The clock 52 may also be a real time clock or a relative time clock that is periodically set by the central office 40. A central reference signature extraction circuit 54 and associated clock 56 serve to extract signatures and times of extraction of cable originated programs and signatures of prerecorded programs. Alternatively, extraction circuits may be placed at the head ends of cable system to extract reference signatures of cable programs. The signature extraction performed by the various extraction circuits and data storage is controlled by the central computer system 48.

Figures 3, 4, 5:
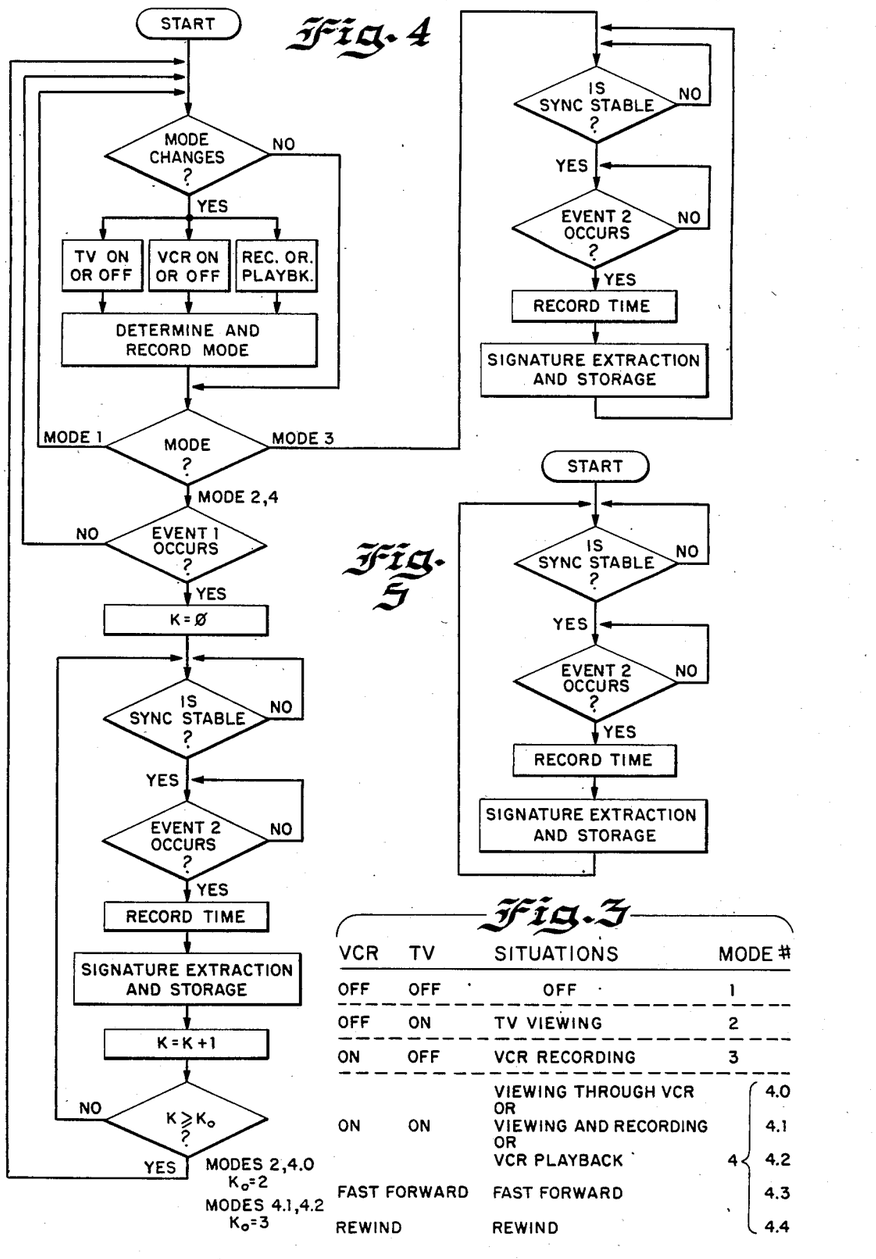
FIG. 3 is a chart illustrating the various modes of viewing and recording that can occur in a typical household.
FIGS. 4 and 5 are flow charts illustrating the logical steps performed by the home and central office units, respectively.

The home unit of the system according to the invention monitors the mode of viewing by monitoring the on and off and other functions of the television receiver and any video recorder that may be used in the home. The various modes of viewing or recording are illustrated in FIG. 3. Mode 1 occurs when both the VCR and television receiver are both off, and indicates that no viewing is taking place. Mode 2 represents television viewing and occurs when the television receiver is on and the VCR is off. Mode 3 represents recording by the home VCR and occurs when the television receiver is off and the VCR is on. Mode 4 occurs when the VCR and the television receiver are both on, and can represent one of three conditions. The first condition, designated as mode 4.0, represents television viewing through the tuner of the VCR without recording. Mode 4.1 represents VCR recording and television viewing, while the third condition, designated as Mode 4.2, represents VCR playback. Other modes of operation of the VCR, such as fast forward and rewind, are designated as Modes 4.3 and 4.4, respectively. Most of these modes can be easily detected by monitoring power line voltage or voltages elsewhere in the television set and the video recorder. Modes 4.0, 4.3 and 4.4 can be detected by logic circuitry.

As previously stated, the home unit 10 monitors the viewing mode and the video signal, and extracts signatures from the video signal only if certain events occur. The logic necessary to provide this function is illustrated in FIG. 4. As is apparent from FIG. 4, the mode of operation is recorded whenever there is a change in the mode, such as, for example, a change from viewing to recording, etc. Each time the mode changes, a determination is made in order to determine what the new mode is. This is accomplished by determining whether the television is on or off, whether the VCR is on or off, and whether the VCR is in a record or playback mode. Once it has been determined whether the television and VCR are on or off, and whether the VCR is in a record or playback mode, the mode can readily be determined by using a look-up table containing the information in FIG. 3, and the mode is recorded.

If the mode is determined to be Mode 1, indicating no viewing, no further action is taken until the mode changes again. If it is determined that the mode of operation is either Mode 2 or Mode 4, the system monitors the television receiver for the occurrence of an Event 1, which may, for example, be any one of the following:

1. television turn-on
2. a channel change
3. a predetermined time interval (e.g 5-10 minutes) since the previous Event 1
4. a sudden scene change to a black scene.
5. loss of synchronization for an appreciable period of time.

Such Event 1s are relatively easy to detect. For example, television turn on can be detected simply by monitoring an appropriate voltage or current. Television turn-on is not used as an Event 1 in the system illustrated in FIG. 4 but may be used in other systems, particularly systems that do not monitor a VCR and consequently need not employ mode logic. A channel change can be detected by monitoring the position of the tuner mechanism when mechanical tuners are used, by monitoring tuning voltage in electrically tuned tuners, by monitoring local oscillator frequency, or even more simply by monitoring the video synchronization pulses, preferably the vertical synchronization pulses and indicating a channel change in the event of a loss or a change in the syncronization pulse for a short time interval. The predetermined time interval can readily be determined from a clock, and a sudden scene change to black can be readily detected by monitoring the average value of the video signal and indicating a change to a black scene when the average value becomes that representative of an all black scene. A loss of synchronization for an appreciable length of time (longer than that caused by a channel change) indicates fast forward or rewind mode of operation of a VCR (Mode 4.3 or 4.4) or the loss of the video signal (e.g. station off the air).

As long as no Event 1 occurs, the home unit records no new data; however, upon the occurrence of an Event 1, the system is conditioned to extract a signature upon the occurrence of the next two consecutive Event 2s, with an Event 2 being defined as:

1. a scene change to a scene other than a black scene
2. a color change in successive frames or portions thereof
3. a still picture
4. an audio level change.

Ways of detecting the various Event 2s described above, as well as ways for extracting signatures will be discussed in a subsequent portion of the specification.

Upon the occurrence of an Event 1, a counter is set to zero and the video signal is monitored to determine if the television synchronization or sync signal is stable. This is accomplished, for example, by monitoring the vertical synchronization pulses and waiting until a predetermined number, for example, 16, consecutive stable vertical sync pulses are detected before the unit is permitted to detect an Event 2. If the synchronization has not been stable for a significant period of time, more than five seconds, this period will be marked either as television station is off the air or VCR fast forward or rewind.

Once the sync has been stable for the required number of pulses, the system monitors the video signal for the occurrence of an Event 2. Whenever such an Event 2 change is detected, the time of the occurrence of the Event 2 is recorded as is the time interval since the previous Event 2, if the time intervals between Event 2s are to be used as a means of program identification. The signature of the first frame following the last detected Event 2 change is then extracted. Since a standard broadcast television frame consists of two interlaced fields, and since the two fields that form a frame are quite similar, it is not necessary to analyze both fields of the frame to obtain a signature. Typically, a satisfactory signature is obtained from only a single field, for example, the first field of a frame. The method of extracting the signature will be discussed in greater detail in a subsequent portion of the detailed description, as will the method of detecting an Event 2.

Once the signature has been extracted, the counter is incremented by 1. If the count in the counter is less than two, indicating that more signatures are needed, the system is conditioned to respond to another Event 2 to extract and record another signature. If the count in the counter is two (or the required number of signatures) or greater, indicating that the signatures required have been extracted, the system is conditioned to require an Event 1 to occur before it responds to any further Event 2s.

If it is determined that the mode of operation is Mode 3, that is, VCR recording, it is not necessary for an Event 1 to occur before the signal is monitored for Event 2s. The only determination that is made is whether the synchronization is stable, and if so, the system looks for Event 2s continuously and extracts the signature and records the time of occurrence of the signature each time an Event 2 is detected. Thus, all signatures following every Event 2 are extracted and stored so that upon subsequent playback, the program may be identified even though only portions of the tape may be played back.

The logic for extracting reference signatures is illustrated in FIG. 5. Each broadcast and cable channel is monitored continuously by the reference signature extraction circuits 50 and 54, and a signature is extracted each time an Event 2 occurs to provide a reference library of reference signals. Consequently, since it is desired to extract a signature that occurs after every Event 2, Event 1s are not monitored. All that is required is that the sync be stable and that an Event 2 occur. Thus, whenever an Event 2 occurs, the time of occurrence of the Event 2 as well as the signature of the scene following the scene change is recorded for future comparison with signatures received from the various home units. The time intervals between Event 2s may be recorded or obtained from the times of occurrence of the Event 2s.

Figures 6, 7:
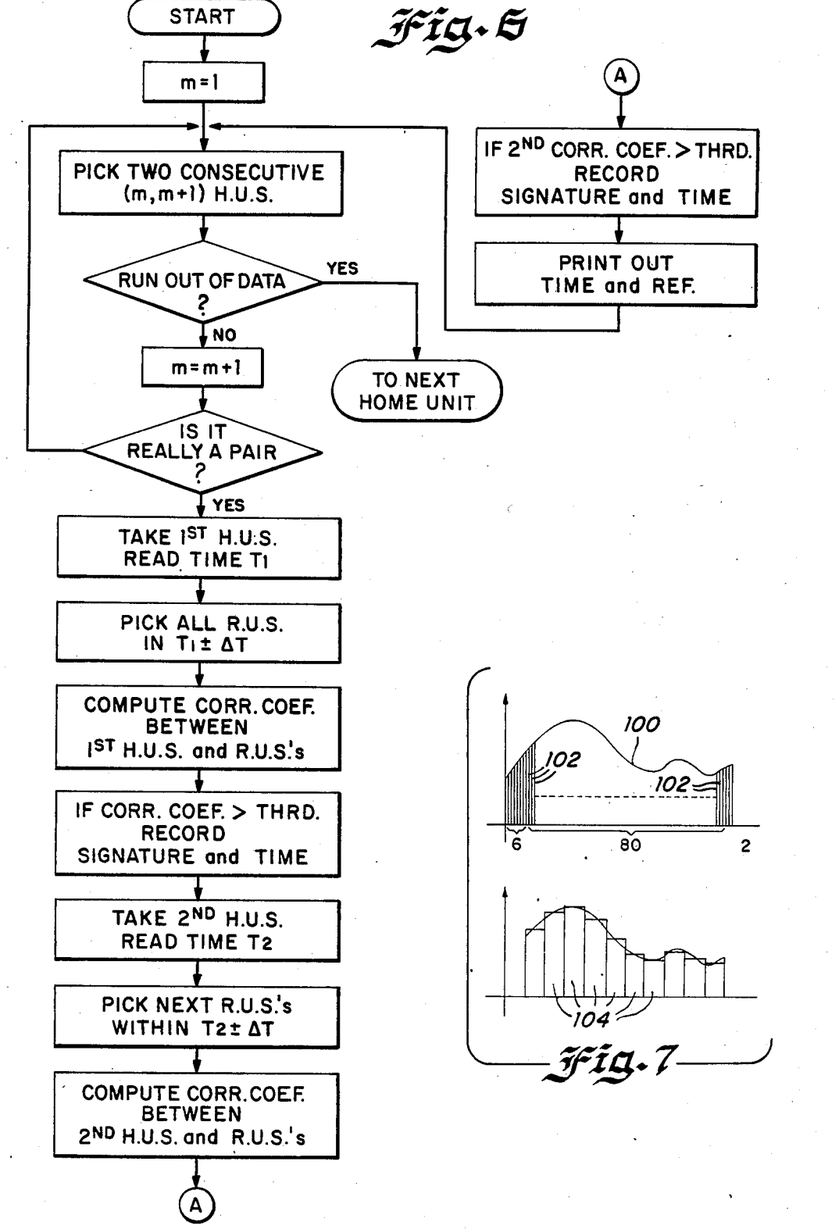
FIG. 6 is a flow chart illustrating the logical steps performed by the central office unit in identifying signatures.
FIG. 7 illustrates how signatures and scene changes may be extracted from the video envelope.

The logic employed by the central computer system 48 of the central unit 40 in order to identify a program is illustrated in FIG. 6. As is illustrated in FIG. 6, two consecutive signatures from a home unit are selected. If there is not enough data to define two consecutive signatures, the next home unit is monitored. After two consecutive signatures are selected, a check is made to determine whether the signatures really are a pair, for example, that there is no Event 1 between the two signatures.

If the two signatures are a pair, the time associated with the first home unit signature is read. All reference unit signatures in the data base 46 that occurred within a predetermined time interval of the occurrence of the first home unit signature, for example, plus or minus eight seconds, are selected for comparison, and the correlation coefficient between the first home unit signature and the selected reference unit signatures are computed. If one of the correlation coefficient exceeds a predetermined threshhold, the time associated with the second home unit signature is read. The next several, for example, six, reference unit signatures that occur, for example, within a predetermined time interval, for example, plus or minus eight seconds of the time associated with the second home unit signature are selected, and the correlation coefficients between the second home unit signature and the reference unit signatures are computed. If one of the correlations coefficient exceeds the predetermined threshhold, an identification is made and stored, and printed out, if necessary.

As discussed above, the system according to the invention utilizes a time reference to access reference signatures that occurred at approximately the same time as the home unit signature being evaluated in order to eliminate the need for comparing the home unit signature with all of the reference signatures in the data base 46. However, when a previously recorded program is being played back, the time that the signature occurs during playback cannot be used to locate the reference signal. Thus, in accordance with another important aspect of the present invention, the times of occurrence of signatures that occur when programs are being recorded are also stored. The times of occurrence of signatures that occur in Mode 3 (recording) are kept in a separate recording time file in the data base 46. Similarly, in Mode 4.1 (viewing and recording) the times of signatures are also kept in the recording time file. Thus, when the broadcast is played back (Mode 4.2), even though the recorded signatures cannot be matched to signatures stored in the reference unit during playback, the signature can still be identified by utilizing the recording time instead of the playback time to retrieve the corresponding reference signatures from the reference signature data base 46. Thus, by keeping signatures relating to programs that were broadcast several days or weeks ago within the data base 46, such previously recorded and subsequently played back broadcasts can be readily identified.

Alternatively, in order to identify the playback of previously recorded programs, instead of comparing the signature obtained during playback with reference signatures that represent the programs broadcast several days or weeks ago stored in the recording time file of the reference signature data base 46 (FIG. 2) of the central office unit, the played back signatures may be compared with signatures obtained by the home unit previously during VCR recording (Mode 3) and stored in the data storage 30 (FIG. 1) of the home unit. If desired, the signatures may also be sent to the central office, as are the signatures obtained during normal television viewing, but these signatures would be labeled as VCR recording, and may be stored in the recording time file. However, when playback occurs, the played back signatures would be compared with the signatures stored in the home unit data storage. Only if a match occurred would the signatures be sent to the central office and compared with the signatures stored in the central office data base 46 to identify the program. If no match occurred, the signatures would not be sent. This is because whatever is being played back cannot be identified, and may be something like, for example, a home movie. Thus, the system eliminates the need to search the entire recording file of the data base 46 in an attempt to identify something that cannot be identified.

In the playback mode, when attempting to match the signatures obtained during playback with the signatures stored in the data storage 30, it is convenient to use the time intervals between the occurrence of the signatures (or Event 2s) to generate a time interval signature, TIS, (discussed in greater detail in a subsequent portion of the specification) to obtain the match. When using a time interval signature for matching, three or more consecutive signatures are extracted, and the time intervals between the signatures are compared with the time intervals between signatures stored in the data storage 30. When a pair of consecutive time intervals is found, a match is indicated. If greater accuracy is desired, more than three consecutive signatures may be extracted to provide more than two consecutive time intervals.

Event 2s may be detected in a variety of ways. For example, the video signal may be low pass filtered, for example, through a low pass filter having a cut-off frequency on the order of approximately 2 to 6 kiloHertz, and its average amplitude detected. The signal may be digitized by assigning a number representative of the average amplitude of the video signal for each frame. The numbers thus obtained may be compared in various ways. For example, the numbers obtained from different frames may be compared, and if the numbers are substantially different, a scene change will be indicated. The numbers compared may be obtained from consecutive frames or from non-consecutive frames, for example, frames spaced by a 20 to 40 frame interval, depending on the type of event that has been defined as the Event 2. Alternatively, a moving average of the numbers representative of the video amplitudes of the last several frames may be calculated, and the number representative of the average amplitude of the last detected frame compared with the moving average to indicate a scene change if the number associated with the last frame substantially differs from the moving average.

The various comparing schemes are useful for identifying various different types of Event 2s. For example, comparing the number associated with a particular frame with the number associated with a previous frame is useful for detecting an Event 2 that may be termed an instant scene change. A moving average comparison or a comparison with frames that occurred several frames ago is useful for detecting an Event 2 that may be termed a fade type scene change wherein one scene is gradually faded in and the previous scene is gradually faded out. Because in a fade type scene change, the change occurs gradually, there is no drastic change in the number associated with consecutive frames, and consequently, such a scene change cannot readily be detected by a system that compares immediately successive frames. Numbers that are substantially identical for several consecutive frames may be used to indicated a still picture.

Other methods of detecting an Event 2 include detecting a color change, for example, by detecting the average amplitude of a particular color component, such as, for example, a red component, of each frame or a particular line or lines of each frame, and making comparisons of the types described above. Alternatively, different color components or an average of the three color signals can be monitored for each frame and comparisons made. In addition, rather than monitoring an entire frame, only portions of a frame may be monitored. These portions may be selected to be those portions of a frame that normally do not change unless a scene change occurs. Such portions may occur near the top or bottom of the screen because such areas are less likely to be affected by action or movement occurring within a scene. The Event 2s may be detected electronically by monitoring the video envelope, or by monitoring the cathode ray tube, for example, by placing a light sensitive photoelectric device 36 (FIG. 1) in proximity with the cathode ray tube, preferably in one corner thereof. Alternatively, the audio signal may be monitored by an audio processing circuit 38 and applied to the analog-to-digital converter 25 to generate an Event 2 when the audio signal departs from a predetermined level.

In accordance with an alternative embodiment of the present invention that is particularly suitable for identifying prerecorded programs, the time intervals between events, or in changes in one or more predetermined parameters, can be used to define a feature string. Such a system can be used either alone, or in combination with a signature extracting system to identify the program. When used alone, the amount of data generated by the system is less than that generated by a signature generating system, and therefore, does not require much computation time to obtain a correlation. Consequently, it is not necessary to store the time of occurrence of each change (unless it is desired for other reasons), but rather, only the elapsed time between such changes need be stored. Such a system is particularly useful in identifying the playback of prerecorded programs, or delayed broadcast programs because real time data is not necessary to make the identification.

In a system wherein the intervals between predetermined changes in predetermined events are used to generate a time interval signature (TIS) the time interval signature, which can be represented as a digital code sequence, can be constructed by measuring the time intervals between the sequential occurrences of regularly occurring events in a broadcast. Preferably, the chosen events should have the following properties:
1. Be readily measurable automatically.
2. Occur at a sufficiently high rate that enough intervals are available to allow unique identification of the signal.
3. Always be present
4. Cannot be controlled by program originators to render identification vulnerable to changes in programming methods.

Typical events that can be used as the events to generate a time interval string includes scene changes to black, Event 2s, including shifts in the average amplitude of the video signal, departures in the amplitude of the instantaneous video signal from the average, shifts in the video color balance, changes in the average color of a predetermined line, for example, a line near the top of the screen, a predetermined audio power level, for example, silence, etc. Thus, to define a time interval string, the home unit would a generate time interval string (TIS) by detecting one of the predetermined events, for example, an Event 2 such as a scene change, and store the time intervals between consecutive changes.

The monitoring of events can be done continuously to generate a long TIS without requiring an excessive memory capacity because such changes occur relatively infrequently, and the time intervals therebetween can be defined by only a few bits. The TIS's thus obtained from the home unit are compared with reference TIS's stored in the central unit.

However, in order further to reduce the amount of data that must be stored, the time intervals between the events being monitored may be monitored only after the occurrence of another predetermined event, such as an Event 1; and it has been found that satisfactory identification can be obtained by generating a feature string consisting of three time intervals between changes in the monitored variable, such as a scene change or other Event 2. The time interval strings thus generated are matched with reference time interval strings that are obtained in much the same way as those generated by the home units except that the reference time interval strings are continuously generated for each broadcast or other program source being monitored.

Referring now to FIG. 7, there is shown a video envelope 100 as provided from the video processing circuit 22 (FIG. 1) to the analog-to-digital converter 25. The analog-to-digital converter 25 takes a plurality of samples 102 (FIG. 7) for example, 80 samples during a single frame interval, and generates a digital value representative of the amplitude of each of the samples 102. The digital values thus generated are applied to the events detector 26 (FIG. 1) and to the signature extraction circuit 28 and used to detect the various events and to extract signatures.

In order to detect an Event 2, for example, a scene change, the events detector 26 compares each of the digitized samples 102 of a current frame with a corresponding digitized sample 102 of a previous frame, either the immediately preceding frame or another previous frame, depending on the type of scene change to be detected. The counterpart samples are then compared to determine whether a scene change has occurred. More specifically, the detection of a scene change occurs as follows:

1. Take, for example, 80 samples of the video envelope of each frame
2. Compare counterpart samples of a current frame and a previous frame
3. Take the absolute value of the difference of each of the counterpart samples
4. Take the average of the absolute values
5. Indicate a scene change if the average of the absolute values exceeds a predetermined threshhold.

The indication of a scene change is applied to the signature extraction circuit 28 (FIG. 1) to cause the signature extraction circuit 28 to operate on the digitized samples 102 to extract the signature.

The signature extraction circuit 28 operates on the digitized samples 102 by taking the average value of consecutive samples 102, for example, eight consecutive samples to generate a total of, for example, ten features 104 that comprise an image signature. Typically, four bits define a feature, and consequently, an image signature can be defined by forty bits of data for the example discussed above; however, in some instances more features and more data may be required.

Both the home unit 10 (FIG. 1) and the reference signature extraction circuits 50 and 54 (FIG. 2) operate in the same manner to extract signatures, the only difference in operation being that the signature extraction circuit 28 (FIG. 1) requires an Event 2 to be preceded by an Event 1 before signature extraction occurs; but the reference signature extraction circuits 50 and 54 (FIG. 2) do not require an Event 1 to precede an Event 2, but rather extract a reference signature each time an Event 2 occurs.

Once the home unit signatures and the reference signatures are obtained, the home unit signatures will be compared with the reference unit signatures, normally with those signatures occurring in corresponding time intervals. The correlation coefficients between the home unit signatures and the reference unit signatures will be compared, and the reference signature that has the best correlation to the home unit signature will be used to identify the program viewed, provided that the correlation coefficient exceeds a minimum threshhold. If it does not, no match will be indicated.

Obviously, modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A method of identifying a signal received by an audience member's television receiver for determining audience ratings comprising the steps of:
   detecting the occurence of a first event in the functional operations of he audience namber's televison receiver;
   detecting the occurence of a second event after the detected first event in the signal to be identified;
   extracting a signature from a single frame of the video signal to be identified after the occurrence of the second event;
   storing the signature and the time of occurence thereof; and
   comparing the stored signature with reference signatures that occurred at approximately the same time as the stored signature.

2. The method recited in claim 1 wherein said signal is a television video signal and said second event is a scene change from one video scene to another video scene.

3. The method recited in claim 1 wherein said signal is a color television video signal and said second event is a change in the color of at least a portion of successive frames.

4. The method recited in claim 1 wherein said signal is a television video signal and said second event is a still picture.

5. The method recited in claim 1 wherein said signal is an audio signal said second event is a predetermined change in the magnitude in the audio signal.

6. The method recited in claim 1 wherein said signal is a television signal received by a television signal receiver and wherein said first event is the turn-on of the televison receiver.

7. The method recited in claim 1 wherein said signal is a television signal received by a televsion signal receiver receiver and wherein said first event is a change in the channnel to which the television signal receiver is tuned.

8. The method recited in claim 1 wherein said first event is the elapse of a predetermined length of time after the occurrence of the previous first event.

9. The method recited in claim 8 wherein said predetermined length of time is approximately 5 to 10 minutes.

10. The method recited in claim 1 wherein said signal is a television signal and said step of extracting said signature includes the step of low pass filtering a video signal of the televison signal to provide a video envelope signal, periodically sampling said video envelope signal to provide a series of video samples, and digitizing said video samples to provide said signature.

11. The method recited in claim 10 wherein said step of low pass filtering said video signal includes the step of passing the video signal through a low pass filter having a cut-off frequency of approximately 2 to 6 kHz.

12. The method recited in claim 11 wherein the step of sampling said video envelope signal includes the step of taking eightly samples of said video envelope signal and taking the average of every eight consecutive samples to generate ten features that comprise the feature string.

13. The method recited in claim 10 wherein the step of sampling said video envelope signal includes the step of taking a predetermined number of samples of said video envelope signal and taking the averages of predetermined consecutive samples to generate a plurality of average signals, each average signal defining one of the features that comprises the feature string.

14. A system for identifying program material received by an audience member's televison receiver for determining audience ratings comprising:
means for detecting a first predetermined event in the functional operations of the audience member's television receiver;
means for detecting a second predetermined event in the program material;
means for extracting at least one predetermined characteristic of the program material from a single frame of a video signal;
means for storing the predetermined characteristic and the time that the predetermined characteristic is extracted; and
means for comparing the recorded predetermined characteristic and its time of occurrence with reference predetermined characteristics that occured at substantially the same time to identify the program.

15. A system for identifying a signal received by an audience member's television receiver for determining audience ratings comprising:
means for detecting the occurrence of a first event in the functional operations of the audience member's television receiver;
means responsive to the detected first event for detecting the occurrence of a second event in the signal to be identified;
means for extracting a signature from a single frame of the video signal to be identified after the occurence of the second event;
means for storing the signature and the time of occurence thereof; and
means for comparing the stored signature with reference signatures that occur at approximately the same time as the stored signature.

16. The system recited in claim 15 wherein said signal is a television video signal and said second event detecting means includes means for detecting a scene change from one video scene to another video scene.

17. A system as recited in claim 16 wherein said television signal is received by a television signal receiver, and wherein said means for detecting said first event includes means for detecting the turn-on of the television receiver.

18. A system as recited in claim 15 wherein said signal is a television signal received by a television signal receiver, and wherein said first event detecting means includes means for detecting a change in the channel to which the television signal receiver is tuned.

19. A system as recited in claim 15 wherein said first event detecting means includes means for detecting the elapse of a predetermined length of time after the occurrence of the previous first event.

20. A system as recited in claim 19 wherein said detecting means includes means for setting the predetermined length of time to approximately 5 to 10 minutes.

21. A system as recited in claim 15 wherein said signal is a television signal and said means for extracting said signature includes means for low pass filtering a video signal of the television signal to provide a video envelope signal, means for periodically sampling said video envelope signal to provide a series of video samples, and means for digitizing said video samples to provide said signature.

22. A system as recited in claim 21 wherein said low pass filtering means has a cut-off on the order frequency of approximately 2 to 6 kHz.

23. A system as recited in claim 22 wherein said video envelope signal sampling means includes means for taking approximately eighty samples of said video envelope signal and means for taking the average of every eight consecutive samples to generate ten features that comprise the feature string.

24. A system as recited in claim 21 wherein said video envelope signal sampling means includes means for taking a predetermined number of samples of video envelope signal and means for taking the averages of predetermined consecutive samples to generate a plurality of average signals, each average signal defining one of the features that comprises the feature string.

25. A system for identifying program material received by an audience member's television receiver for determining audience ratings comprising:
means for detecting a first predetermined event in the functional operations of the audience member's television receiver;
means responsive to the detected first predetermined event for detecting at least one second predetermined event in the programmed material;
means for extracting at least one predetermined characteristic of the program material from a single frame of a video signal after the occurrence of a predetermined number of said first and second events; and means for recording the predetermined characteristic and the time of occurrence of the predetermined characteristic.

26. The system recited in claim 25 wherein said system further includes a central unit, means for transmitting the recorded predetermined characteristics and times to the central unit, wherein the central unit includes means for comparing the recorded predetermined characteristics and their times of occurrence with reference predetermined characteristics that occurred at substantially the same times to identify the program.

27. The system recited in claim 26 further including means for generating said reference predetermined characteristics, wherein said reference predetermined characteristic generating means includes means for receiving signals representative of various programs gram to be monitored and means for continuously extracting and storing said predetermined characteristics of the programs being monitored to generate said reference predetermined characteristics.

28. A method for identifying signals for determining audience ratings comprising the steps of operating on the signal to be identified in order to extract a feature string, comparing the feature string with various feature strings corresponding to known signals and identifying the signal when the feature string of the signal to be identified correlates with one of the feature strings corresponding to a known signal within a predetermined tolerence, wherein the step of extracting the feature string from the signal to be identified comprises the steps of:

monitoring predetermined changes in a predetermined parameter of the signal to be identified;

determining the time intervals between the predetermined changes in the predetermined parameter; and utilizing the time intervals between successive predetermined changes to generate the feature string, the feature string being a digital representation of a predefined number of said time intervals.

29. The method recited in claim 28 wherein the signal to be identified includes an audio signal, and wherein the step of extracting the feature string includes the step of monitoring the amplitude of the audio signal and determining the time intervals that the amplitude of the audio signal departs from a predetermined level of amplitude.

30. The method recited in claim 29 wherein the predetermined level amplitude is a level that corresponds substantially to silence, and said time interval corresponds to the time interval between successive periods of silence in the audio signal.

31. The method recited in claim 28 wherein the signal to be identified includes a video signal, and wherein the step of extracting the feature string includes the steps of detecting predetermined events in the video signal and determining the time intervals between detected predetermined events to generate the feature string.

32. The method recited in claim 31 wherein the step of detecting predetermined events includes the step of monitoring the light emanating from a display on which the video signal is displayed, and indicating a detected predetermined event when the amount of light emanating from the display changes by a predetermined amount.

33. The method recited in claim 32 wherein the step of monitoring the light emanating from the display includes the step of monitoring the light with a photoelectric device, and indicating a detected predetermined event when the output of the photoelectric device changes by a predetermined amount.

34. The method recited in claim 31 wherein the step of detecting predetermined events includes the step of determining the average amplitude of the video signal and indicating a detected predetermined event when the average amplitude of the video signal changes by a predetermined amount.

35. The method recited in claim 31 wherein the step of detecting predetermined events includes the step of monitoring the video envelopes of at least one field of two frames.

36. The method recited in claim 35 wherein the step of monitoring the video envelope of two frames includes the step of comparing the envelopes of at least one field of two consecutive frames.

37. The method recited in claim 35 wherein the step of monitoring the video envelope of two frames includes the step of comparing the envelopes of at least one field of two non-consecutive frames.

38. The method recited in claim 37 wherein the step of comparing the video envelope of two non-consecutive frames includes the step of comparing the video envelopes of two frames spaced at approximately a twenty to forty frame interval.

39. The method recited in claim 38 wherein the step of comparing the video envelope of two frames includes the step of sampling said video envelope and comparing counterpart samples.

40. The method recited in claim 31 wherein the step of detecting predetermined events includes the steps of monitoring the video envelopes of two frames, obtaining a predetermined number of samples from each envelope and comparing the magnitudes of counterpart samples to obtain a difference in counterpart samples, taking the average of the differences, and indicating a detected predetermined event whenever the average exceeds a predetermined level.

41. The method recited in claim 40 wherein the step of comparing and taking the difference of counterpart samples includes the step of taking the difference of the absolute values of the counterpart samples.

42. The method recited in claim 40 wherein said predetermined number of samples is eighty.

43. The method recited in claim 40 further including the step of obtaining a signature including the step of monitoring the video envelope of a predetermined frame, obtaining a predetermined number of samples from said envelope, obtaining the average of a predetermined number of consecutive samples to define said signature.

44. The method recited in claim 31 wherein the step of detecting predetermined events includes the steps of determining the average level of the video signal, determining the amplitudes of predetermined portions of the video signal, comparing the amplitudes of the predetermined portions of the video signal with the average amplitude of the video signal and assigning one of a first and a second designation to each portion depending on whether the amplitude of the predetermined portion exceeds or is less than the average amplitude, utilizing the designations so obtained to obtain a frame code, comparing the frame code with the frame code of a previous frame, and indicating a change if the current frame code differs from the previous frame code by a predetermined amount.

45. The method recited in claim 28 wherein said signal to be identified includes a video signal said video signal includes a color signal, wherein the step of extracting the feature string includes the step of determining the time interval between predetermined changes in the color signals.

46. The method recited in claim 45 wherein the step of determining changes in the color signal includes the step of comparing a function of the color signal with the average of the color signal and determining the time intervals when the function of the color signal exceeds the average of the color signal and the time intervals when the function of the color signal is less than the average of the color signal to extract the feature string.

47. The method recited in claim 46 wherein the function of the color signal and the average of the color signal is determined for only a single line of the frame.

48. The method recited in claim 47 wherein the single line is near the top of the image.

49. In a system for identifying signals for determining audience ratings having means for operating on the signal to be identified in order to extract a feature string, means for comparing the feature string with various feature strings corresponding to known signals and for identifying the signal when the feature string of the signal to be identified correlates with one of the feature strings corresponding to a known signal within a predetermined tolerance, the improvement wherein the feature string extracting means comprises:
   means for monitoring predetermined changes in a predetermined parameter of the signal to be identified;
   means for determining the time intervals between the predetermined changes in the predetermined parameter; and
   means for utilizing the time intervals between successive predetermined changes to generate the feature string, the feature string being a digital representation of a predetermined number of said time intervals.

50. The improvement recited in claim 49 wherein the signal to be identified includes an audio signal, and wherein said feature string extracting means includes means for monitoring the amplitude of the audio signal and determining the time intervals that the amplitude of the audio signal departs from a predetermined level of amplitude.

51. The improvement recited in claim 50 wherein the predetermined level amplitude is a level that corresponds substantially to silence, and said time interval corresponds to the time interval between successive periods of silence in the audio signal.

52. The improvement recited in claim 49 wherein the signal to be identified includes a video signal, and wherein said feature string extracting means includes means for detecting predetermined events in the video signal and determining the time intervals between detected predetermined events to generate the feature string.

53. The improvement recited in claim 52 wherein predetermined events detecting means includes means for monitoring the light emanating from the display on which the video signal is displayed and indicating a scene change predetermined event when the amount of light emanating from the display changes by a predetermined amount.

54. The improvement recited in claim 53 wherein the display light monitoring means includes means for monitoring the light with a photoelectric device, and indicating a detected predetermined event when the output of the photoelectric device changes by a predetermined amount.

55. The improvement recited in claim 52 wherein the predetermined event detecting means includes means for determining the average amplitude of the video signal and indicating a detected predetermined event when the average amplitude of the video signal changes by a predetermined amount.

56. The improvement recited in claim 52 wherein the predetermined event detecting means includes means for comparing the video envelopes of two frames.

57. The improvement recited in claim 56 wherein the video envelope monitoring means includes means for comparing the envelopes of at least one field of two consecutive frames.

58. The improvement recited in claim 56 wherein the video envelope monitoring means includes means for comparing the envelopes of at least one field of two non-consecutive frames.

59. The improvement recited in claim 58 wherein the video envelope comparing means includes means for comparing the video envelopes of two frames spaced at approximately twenty to forty frame intervals.

60. The improvement recited in claim 56 wherein the video envelope comparing means includes means for sampling said video envelope and comparing counterpart samples.

61. The improvement recited in claim 52 wherein said predetermined event detecting means includes means for monitoring the video envelopes of two frames, means for obtaining a predetermined number of samples from each envelope, means for comparing the magnitudes of counterpart samples to obtain a difference in counterpart samples, and means for taking the average of the differences and for indicating a detected predetermined event whenever the average exceeds a predetermined level.

62. The improvement recited in claim 61 wherein the comparing and counterpart samples difference taking means includes means for taking the differences of the absolute values of the counterpart samples.

63. The improvement recited in claim 61 wherein said predetermined number of samples is eighty.

64. The improvement recited in claim 61 further including means for obtaining a signature including means for monitoring the video envelope of a predetermined frame and obtaining a predetermined number of samples from said envelope, and means for obtaining the average of a predetermined number of consecutive samples to define said signature.

65. The improvement recited in claim 52 wherein the step of determining Event 2s includes means for determining the average level of the video signal, means for determining the amplitudes of predetermined portions of the video signal, means for comparing the amplitudes of the predetermined portions of the video signal with the average amplitude of the video signal and assigning one of a first and a second designation to each portion depending on whether the amplitude of the predetermined portion exceeds or is less than the average amplitude, means for utilizing the designations so obtained to obtain a frame code, means for comparing the frame code with the frame code of a previous frame and indicating a change if the current frame code differs from the previous frame code by a predetermined amount.

66. The improvement recited in claim 50 wherein said signal to be identified includes a video signal and said video signal includes a color signal, wherein the feature string extracting means includes means for determining the time interval between predetermined changes in the color signals.

67. The improvement recited in claim 66 wherein the color signal change determining means includes means for comparing a function of the color signal with the average of the color signal and determining the time intervals when the function of the color signal exceeds the average of the color signal and the time intervals when the function of the color signal is less than the average of the color signal to extract the feature string.

68. The improvement recited in claim 67 wherein the function of the color signal and the average of the color signal is determined for only a single line of the frame.

69. The improvement recited in claim 68 wherein the single line is near the top of the image.

70. A system for identifying signals for determining audience ratings comprising:
    means for detecting the occurence of predetermined events in the signal;
    means responsive to said detecting means for determining the time intervals between successive occurences of said predetermined events; and
    means responsive to said time intervals for generating a signal identifying feature string in response to said time intervals, said signal identifying feature string being a digital representation of a predefined number of said time intervals.

71. The system recited in claim 70 further including means for comparing the feature string with reference feature strings representative of known signals and for identifying said signal when said feature string correlates with one of said reference feature strings within a predetermined coefficient of correlation.

72. A method of identifying a television signal received from either a television receiver or a video recorder for determining audience viewing habits comprising the steps of:
    detecting predetermined operational modes of the audience member's television receiver and the video recorder;
    detecting the occurence of a first event in one of the operational modes;
    detecting the occurence of a second event in the signal to be identified;
    extracting a signature from a single frame of the video signal to be identified after the occurence of the second event; and
    storing the extracted signature, the time of the signature extraction and the detected operational mode.

73. The method recited in claim 72 further including the step of comparing the extracted signature with reference signatures.

74. The method recited in claim 73 wherein said reference signatures are extracted by the steps of:
    monitoring a known signal;
    detecting the occurrence of said second event in the known signal;
    extracting a reference signature from the known signal after the occurence of a second event; and
    storing the reference signature and the time of occurence thereof.

75. The method recited in claim 74 wherein the step of comparing includes the step of comparing the extracted signature with reference signatures that occurred at approximately the same time as the extracted signature.

76. The method recited in claim 72 wherein said second event is a scene change from one video scene to another video scene.

77. The method recited in claim 72 whrein said television signal is a color television video signal and said second event is a change in the color of at least a portion of successive frames.

78. The method recited in claim 72 wherein said second event is a still picture.

79. The method recited in claim 72 wherein said second event is a predetermined change in the magnitude in an audio signal of the television signal.

80. The method recited in claim 72 wherein said first event is the turn-on of the television receiver.

81. The method recited in claim 72 wherein said first event is a change in the channel to which the television signal receiver is tuned.

82. The method recited in claim 72 wherein said first event is the elapse of a predetermined length of time after the occurence of the previous first event.

83. The method recited in claim 82 wherein said predetermined length of time is approximately 5 to 10 minutes.

84. The method recited in claim 72 wherein said step of extracting said signature includes the step of low pass filtering a video signal of the television signal to provide a video envelop signal, periodically sampling said video envelope signal to provide a series of video samples, and digitizing said video samples to provide said signature.

85. The method recited in claim 84 wherein said step of low pass filtering said video signal includes the step of passing the video signal through a low pass filter having a cut-off frequency of approximately 2 to 6 kHz.

86. The method recited in claim 85 wherein the step of sampling said video envelope signal includes the step of taking eighty samples of said video envelope signal and taking the average of every eight consecutive samples to generate ten features that comprise the feature string.

87. The method recited in claim 85 wherein the step of sampling said video envelope signal includes the step of taking a predetermined number of samples of said video envelope signal and taking the averages of predetermined consecutive samples to generate a plurality of average signals, each average signal defining one of the features that comprises the feature string.

88. A system for identifiying program material viewed on a television receiver or recorded by a video recorder for determining audience viewing habits comprising:
    means for detecting predetermined operational modes of the television receiver and the video recorder;
    means for detecting a first predetermined event in one of the operational modes;
    means for detecting a second predetermined event in the program material;
    means responsive to the detected predetermined operational modes for extracting a predetermined characteristic of the program material from a single frame of a video signal after the occurrence of said second predetermined event; and means for storing the predetermined characteristic, the time the predetermined characteristic is extracted and the detected predetermined operational mode.

89. A system as recited in claim 88 wherein said extracting means includes means for extracting said predetermined characteristic upon the second occurence of the second predetermined event following the occurence of said first event.

90. A system as recited in claim 89 wherein said extracting means includes means responsive to a detected recording operational mode for extracting said predetermined characeristic upon each occurrence of the second predetermined event, and wherein the predetermined characteristic further includes the time interval between the second event and the immediately preceding second event.

91. A system as recited in claim 88 further including means for comparing the extracted predetermined characteristics with stored reference predetermined characteristics to identify the program material.

92. A system for identifying a television signal received from both a television receiver and a video recorder for determining audience viewing habits comprising:
    means for detecting predetermined changes in the operational modes of the television receiver and the video recorder;
    means for detecting the occurence of a first event in one of the operational modes;
    means responsive to both the detection of a first event and a detected viewing operational mode for detecting the occurrence of a second event in the signal to be identified;
    means responsive to a detected recording operational mode for detecting the occurence of a second event in the signal to be identified;
    means responsive to the detection of a second event for extracting a signature from a single frame of the video signal to be identified after the occurence of the second event; and
    means for storing the extracted signature and the detected operational mode.

93. A system as recited in claim 92 further including means for comparing said stored signatures with reference signatures obtained from known signals to identify the signal.

94. A system as recited in claim 93 further including means for obtaining the reference signatures, said reference signal obtaining means including means for monitoring known signals, means for detecting the occurrence of second events in said known signals, and means responsive to the detection of the second events for extracting reference signatures from the known signals because real time data is not necessary to make the identification.

95. A system as recited in claim 94 wherein said comparing means includes means for comparing an extracted signature with reference signatures that occurred at approximately the same time.

96. The system reicted in claim 92 wherein said second event detecting means includes means for detecting a scene change from one video scene to another video scene.

97. A system as recited in claim 93 wherein said means for detecting said first event includes means for detecting the turn-on of the television receiver.

98. A system as recited in claim 92 wherein said first event detecting means includes means for detecting a change in the channel to which the television signal receiver is tuned.

99. A system as recited in claim 92 wherein said first event detecting means includes means for detecting the elapse of a predetermined length of time after the occurrence of the previous first event.

100. A system as recited in claim 99 wherein said detecting means includes means for setting the predetermined length of time to approximately 5 to 10 minutes.

101. A system as recited in claim 92 wherein said means for extracting said signature includes means for low pass filtering a video signal of the television signal to provide a video envelope signal, means for periodically sampling said video envelope signal to provide a series of video samples, and means for digitizing said video samples to provide said signature.

102. A system as recited in claim 101 wherein said low pass filtering means has a cut-off on the order frequency of approximately 2 to 6 kHz.

103. A system as recited in claim 102 wherein said video envelope signal sampling means includes means for taking approximately eighty samples of said video envelope signal and means for taking the average of every eight consecutive samples to generate ten features that comprise the feature string.

104. A system as recited in claim 101 wherein said video envelope signal sampling means includes means for taking a predetermined number of samples of said video envelope signal and means for taking the averages of predetermined consecutive samples to generate a plurality of average signals, each average signal defining one of the features that comprises the feature string.

105. In a system for identifying programs viewed on a television receiver, wherein the programs are obtained from a video recorder and from an external program source, the improvement comprising:
    means responsive to the on/off condition of the television;
    means responsive to the on/off condition and the play/record condition of the video recorder;
    logic means responsive to the television condition responsive means and the video recorder condition responsive means for providing an indication if the program being viewed is being obtained from the video recorder or from the external program source;
    means for identifying the program being viewed, said identifying means being responsive to said logic means and operative to identify said program according to two different criteria depending on whether the program being viewed is obtained from the external program source or form the video recorder.

106. The improvement recited in claim 105 further including means responsive to said video recorder condition responsive means for storing data representative of the program being viewed in two different manners depending on whether or not the program being viewed is being recorded.

107. In a system for determining the viewing habits of a household having a video recorder capable of recording programs obtained from an external program source and playing video programs, and a television receiver for viewing programs obtained from the external program source and from the video recorder, said system having a home unit and a central unit, the improvement comprising:

means responsive to predetermined operating conditions of said television receiver and said video recorder to provide signals representative of television viewing, recording, and playback;

means for detecting during viewing a first predetermined event in the program material;

means responsive to the detection of said first predetermined event for detecting during viewing a second predetermined event in the program material;

means responsive to the detection of said second predetermined event for extracting during viewing at least one predetermined characteristic of the program material;

means for storing at the home unit the predetermined characteristic of the viewed program material and the time that the predetermined characteristic is extracted;

means for continuously detecting during recording the second predetermined events in the program material;

means responsive to the detection of said second predetermined events for extracting during recording at least one predetermined characteristic of the program material;

means for storing during recording the predetermined characteristics and the times that the predetermined characteristics are extracted;

means for comparing the predetermined characteristics stored during viewing and recording and their times of occurrence with reference predetermined characteristics stored in the central unit that occurred at substantially the same time to identify the programs viewed and recorded;

means for detecting during playback the first predetermined event in the program material;

means responsive to the detection of said first predetermined event for detecting during playback the second predetermined event in the program material;

means responsive to the detection of said second predetermined event for extracting during playback at least one predetermined characteristic of the program material;

means for recording during playback the predetermined characteristic; and means for comparing the predetermined characteristic recorded during playback with reference predetermined characteristics stored at the central unit at the time of recording to identify the program.

108. In a system for determining the viewing habits of a household having a video recorder and a television receiver, said system having a home unit and a central unit, the improvement comprising:

means responsive to predetermined parameters of said television receiver and said video recorder to provide signals representative of television viewing, playback and recording;

means for detecting during viewing a first predetermined event in the program material;

means responsive to the detection of said first predetermined event for detecting during viewing a second predetermined event in the program material;

means responsive to the detection of said second predtermined event for extracting during viewing at least one predetermined characteristic of the program material;

means at the home unit for storing during viewing the predetermined characteristic and the time that the predetemined characteristic is extracted;

means for continuously detecting during recording the second predetermined events in the program material;

means responsive to the detection of said second predetermined events for extracting during recording at least one predetermined characteristic of the program material;

means at the home unit for storing during recording the predetermined characteristics and the times of occurrence thereof;

means at the home unit for determining time intervals between the detached predetermined second events during recording;

means for detecting during playback the second predetermined events in the program material;

means responsive to the detection of said second predetermined events for extracting during playback at least one predetermined characteristic of the program material;

means at the home unit for determining time intervals between the detected predetermined second events during playback;

means at the home unit for comparing the time intervals between the detected events during playback and the time intervals between the events stored during recording; and means responsive to a match provided by the comparing means for comparing the predetermined characteristics extracted during recording with reference characteristics stored in the central unit to identify the program.

* * * * *